J. C. HALL.
LIFE SAVING ROCKET AND GRAPNEL.
APPLICATION FILED MAY 16, 1919.
1,315,721.
Patented Sept. 9, 1919.
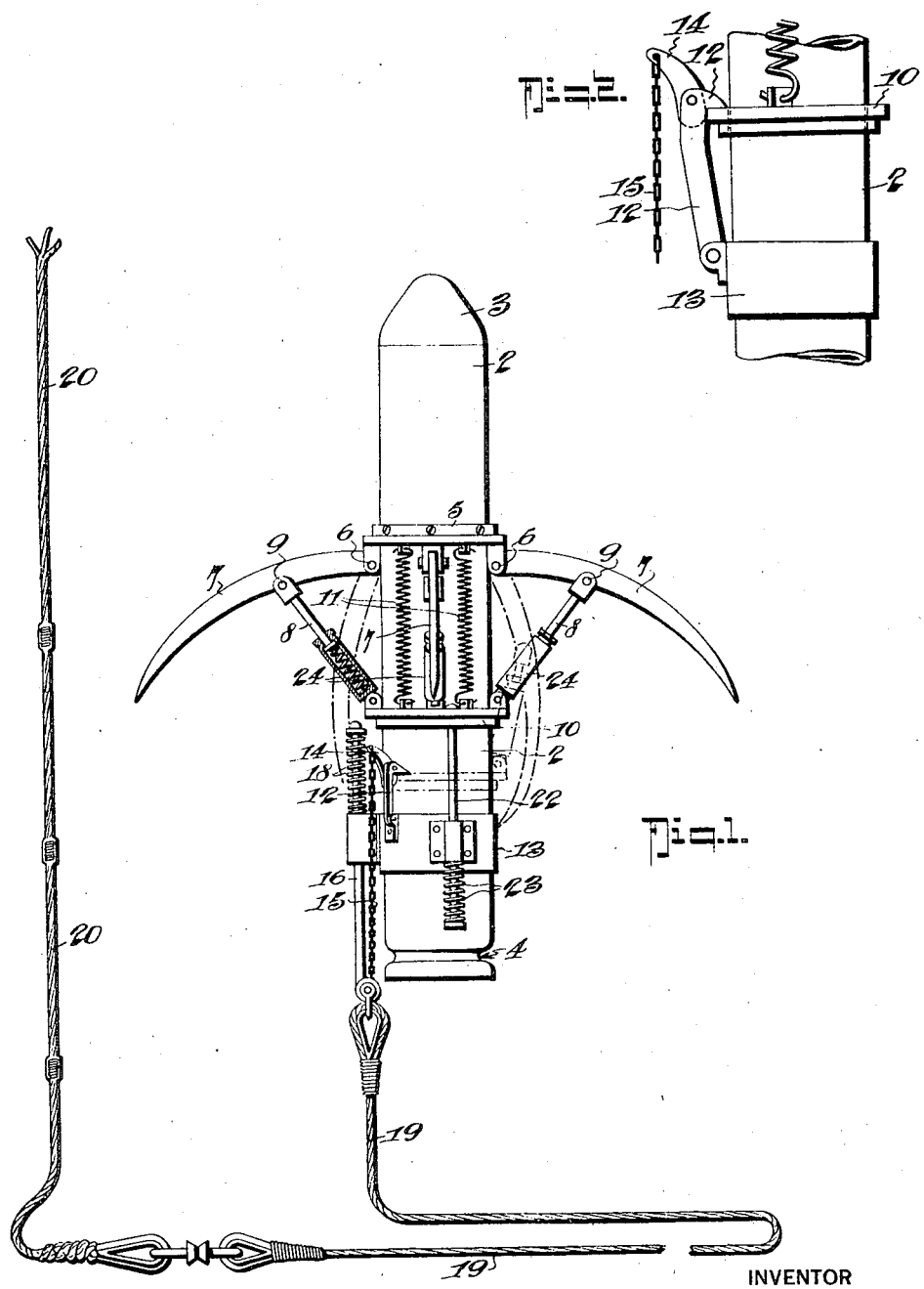
INVENTOR
James C. Hall.
BY
Fred J. Dieterich
ATTORNEYS

UNITED STATES PATENT OFFICE.

JAMES CRESSWELL HALL, OF SEATTLE, WASHINGTON.

LIFE-SAVING ROCKET AND GRAPNEL.

1,315,721.  Specification of Letters Patent.  Patented Sept. 9, 1919.

Application filed May 16, 1919. Serial No. 297,610.

*To all whom it may concern:*

Be it known that I, JAMES C. HALL, a subject of the King of Great Britain, residing at Seattle, in the county of King and State of Washington, have invented certain new and useful Improvements in Life-Saving Rockets and Grapnels, of which the following is a specification.

This invention relates to a life saving rocket which is particularly designed to carry a line to the shore, or to another vessel, and to grapple or obtain a hold of the ground or other object to which it is fired, sufficient to enable a man to pass along the line and convey a heavy line by which passengers and crew may be transported from the ship to the shore, or between ships, as the case may be.

The invention is particularly described in the following specification, reference being made to the drawings by which it is accompanied, in which: Figure 1 is a side elevation and part section, and Fig. 2 is a detail side elevation of the latch which holds the grapnel closed.

In these drawings 2 represents the tube of the rocket, which is provided with the conoidal head 3 closing the upper end and a restricted neck 4 at the open or firing end. About one-third the length of the rocket tube from the head, a ring 5 is secured, around which a series of grapple arms 7 are pivotally mounted at 6, the connections being within the outer circle of the ring and directed toward the after end of the rocket. These arms are convexly curved outward and are pointed. The pointed ends are normally closed against the tube 2, but are susceptible of being extended radially outward by strut connections 8 pin-connected at 9 to each arm and to a ring 10 freely movable on the rocket tube 2 under the action of tension springs 11 between the fixed ring 5 and the movable ring 10.

To hold the arms 7 in their normal position alongside the tube 2 against the extending influence of the springs 11, the movable ring 10 is retained at the lower limit of its movement by a latch 12 pivoted to a band 13 secured to the tube of the rocket adjacent the lower end.

Pivotally mounted on the free end of this latch 12 is a cam ended release lever 14, the cam end of which engages the edges of the ring 10 and when the lever is pulled downward forcibly presses the latch 12 from its hold on the ring, and leaves it free to move upward under the action of its springs 11 to extend the grapple arms 7.

A release stem 16 is slidably mounted in a bearing on the band 13 of the rocket tube, to the lower end of which stem the line 20, which the rocket is designed to carry, is connected by a length of wire rope 19. This length of wire rope 19 forms the tail of the rocket. A chain 15 connects the lower end of the release stem 16 to the release lever 14.

To limit the movement of the movable ring 10 toward the fixed ring 5 and therefore the extension of the arms 7, the ring 10 is connected by stems 22 to the fixed band 13 adjacent the base of the rocket. These stems are slidable in their connection to both the ring 10 and the band 13 and each has a spring 23 on it between the bearing in the band 13 and the end of the stem. These springs cushion the limiting check the stems impose on the movement of the ring 10.

To prevent injury to the arms 7 and their strut connections 8 when any of the extended arms encounter an obstruction during their flight, a compression spring 24, suitably cased, is interposed in each strut connection 8, which spring will permit its arm to close toward the tube 2, without injury to the arm or its connected parts on meeting an obstruction.

In use, the arms 7 are closed against the rocket tube, as indicated by the dot and dash lines in Fig. 1, and are secured in the closed position by the latch 12, and the end of the release lever 14 is connected by the chain 15 to the lower end of the release stem 16. The wire rope tail 19, which forms the connection between the release stem and the line 20 to be carried, is duly connected and the line 20 is coiled in any suitable manner that it may be drawn off without check and without risk of entanglement.

When the rocket is fired, the arms 7 are designed to remain in the closed position until the limit of the rocket's movement is reached, or until the weight of the line is sufficient to release the latch when the arms fly out, being checked in their outward movement by the springs 23. If this release is not effected by the pull of the line during flight, it may be effected after the rocket lands, and with the arms extended the grapnel obtains a secure hold against backward movement to enable a man to pull himself along the line to the shore or to another vessel, and on arrival he can, by means of the line, draw a stronger line across sufficient for general purposes of transportation of passengers and crew.

It will be noted that the wire rope pennant or tail 19 is a substitute for the customary rocket stick and is designed to maintain the elevation of the rocket point. It enables the rocket to be handled more conveniently in a more limited space than the stick would allow and is not liable to injury by the flame from the rocket.

It must also be noted that the life line 20 and the tail 19 and its several intermediate connections to the rocket tube should be of sufficient strength to bear the weight of a man pulling himself through the water by the life line and possibly climbing over precipitous cliffs on the shore, to facilitate which the life line 20 is provided at intervals apart with hand grips or whippings of marline. These need not be carried for more than one hundred and fifty yards from the grapnel and will be such as not to interfere with the free paying out of the line during the rocket's flight.

Having now particularly described my invention, I hereby declare that what I claim as new and desire to be protected in by Letters Patent, is:

1. A life saving grapnel of the class described, comprising the combination with a rocket tube having a life line connected to it, of grapnel arms pivotally mounted on the tube adjacent its center of gravity, means for holding said arms in the closed position against the tube, and means operated by the tension on the life line for releasing the retaining means and permitting the arms to extend.

2. A life saving grapnel of the class described, comprising the combination with a rocket tube, of a flexible metal tail connected to the rocket tube, to the end of which tail the life line is connected, grapnel arms pivotally mounted on the tube adjacent the center of gravity, means extending said arms, means for holding said arms against the rocket tube during flight, and means for releasing the holding means approximate the limit of the rocket's flight.

3. A life saving grapnel, comprising the combination with a rocket tube, of a flexible metal line forming a tail for the rocket, to the end of which line the life line is connected, grapnel arms pivotally mounted on the tube adjacent its center of gravity, a latch retaining said arms in the closed position against the rocket tube, and means coöperative with the flexible line connection for effecting release of the latch and extension of the rocket arms when a predetermined tension is imposed on the line.

4. A life saving grapnel, comprising the combination with a rocket tube having a life line connected to it, grapnel arms pivotally mounted on the tube adjacent its center of gravity, means for holding said arms folded against the rocket during flight, means coöperative with tension on the life line for releasing the arm holding means and permitting them to extend, and resilient means permitting backward movement of the individual arms on encountering an obstruction.

5. A life saving grapnel, comprising the combination with a rocket tube having a life line connected to it, grapnel arms pivotally mounted on the tube adjacent the center of gravity, means for holding said arms folded against the rocket during flight, means coöperative with tension on the life line for releasing the arm holding means and permitting them to extend, and resilient means checking outward movement of the arms at the desired limit and absorbing the shock imposed on the arms when the rocket strikes the ground.

6. A life saving grapnel of the class described, comprising the combination with a rocket tube having a life line connected to it, of a ring secured to the tube adjacent its center of gravity, arms pivotally connected to the ring to be movable in radial planes outward from the tube, a movable ring slidably mounted on the after part of the rocket tube, strut members pivotally connected between the arms and the movable ring, means for drawing the movable ring toward the fixed one, releasable means for connecting the movable ring to the rocket tube, and means for connecting the life line to the movable ring release whereby tension imposed on the tail line will effect release of the movable ring of the radial arms and permit them to outwardly extend.

7. A life saving grapnel of the class described, comprising the combination with a rocket tube, of a ring secured to the tube, grapnel arms pivotally connected to the ring, a second ring endwise movable on the tube between the fixed ring and the after end, strut members pivotally connected between the movable ring and the grapnel arms, each of said strut members having a compression spring permitting individual backward movement of the arms, a band secured to the rocket tube adjacent its after end, stems slidably mounted in the band and connected to the movable ring limiting movement of the ring from the band, springs on such stems checking movement of the ring from the band, a latch member mounted on the band for securing the movable ring with the grapnel arms closed on the rocket tube, a stem slidably mounted in the band to the after end of which stem a life line is connected, a spring on said stem checking movement of it backward, and means for connecting the stem to the latch of the movable ring.

In testimony whereof I affix my signature.

JAMES CRESSWELL HALL.